United States Patent [19]
Meneghetti

[11] Patent Number: 5,613,651
[45] Date of Patent: Mar. 25, 1997

[54] LANDING GEAR AXLE STEERING WITHOUT WALKING BEAM

[75] Inventor: Michael J. Meneghetti, Renton, Wash.

[73] Assignee: The Boeing Company, Seattle, Wash.

[21] Appl. No.: 352,326

[22] Filed: Dec. 8, 1994

[51] Int. Cl.⁶ .................................................. B64C 25/50
[52] U.S. Cl. .................... 244/50; 244/100 R; 244/102 R
[58] Field of Search ........................ 244/100 R, 102 R, 244/102 A, 102 SL, 50, 103

[56] References Cited

U.S. PATENT DOCUMENTS

| | | | |
|---|---|---|---|
| 2,538,388 | 1/1951 | Sievers | 244/50 |
| 2,630,285 | 3/1953 | Geisse | 244/103 R |
| 2,851,231 | 9/1958 | Westcott, Jr. | |
| 3,091,416 | 5/1963 | Knights et al. | |
| 3,904,153 | 9/1975 | Watts | |
| 4,172,571 | 10/1979 | Bowdy | 244/50 |
| 4,948,069 | 8/1990 | Veaux et al. | 244/102 R |
| 5,110,068 | 5/1992 | Grande et al. | |
| 5,207,398 | 5/1993 | Veaux et al. | 244/103 R |
| 5,242,131 | 9/1993 | Watts | |

Primary Examiner—Andres Kashnikow
Assistant Examiner—Tien Dinh
Attorney, Agent, or Firm—Conrad O. Gardner

[57] ABSTRACT

Landing gear axle steering for an aircraft having a six wheel three axle truck. A set of wheels driven about a vertical shaft utilizes a single actuator alone without a walking beam.

2 Claims, 2 Drawing Sheets

LANDING GEAR AXLE STEERING WITHOUT WALKING BEAM

BACKGROUND OF THE INVENTION

A typical six wheel truck assembly is shown in U.S. Pat. No. 5,242,131 to Watts issued Sep. 7, 1993 and also assigned to the Boeing Company the details of which are incorporated herein by reference.

My earlier filed U.S. Patent application titled "Landing Gear Axle Steering" Ser. No. 08/343,812 filed Nov. 22, 1994 also assigned to the Boeing Company, the details of which are incorporated herein by reference provides for a compact steering arrangement utilizing a center locking actuator and walking beam assistance.

In contrast, the present herein after described invention may be utilized in those design conditions where more space is available above the truck beam due e.g. to a wider truck or repositioned torque links and accessories.

SUMMARY OF THE INVENTION

A steerable axle for a six wheel, three axle truck utilizing a single actuator without walking beam assistance.

It is according an object of the present invention to provide single actuator power for driving a wheel axle about the vertical shaft of the wheel axle.

BRIEF DESCRIPTION OF THE DRAWINGS

The foregoing object and many of the attendant advantages of this invention will become more readily appreciated as the stone becomes better understood by reference to the following detailed description when taken in conjunction with the accompanying drawings wherein.

DESCRIPTION OF THE PREFERRED EMBODIMENT

Figure 1:
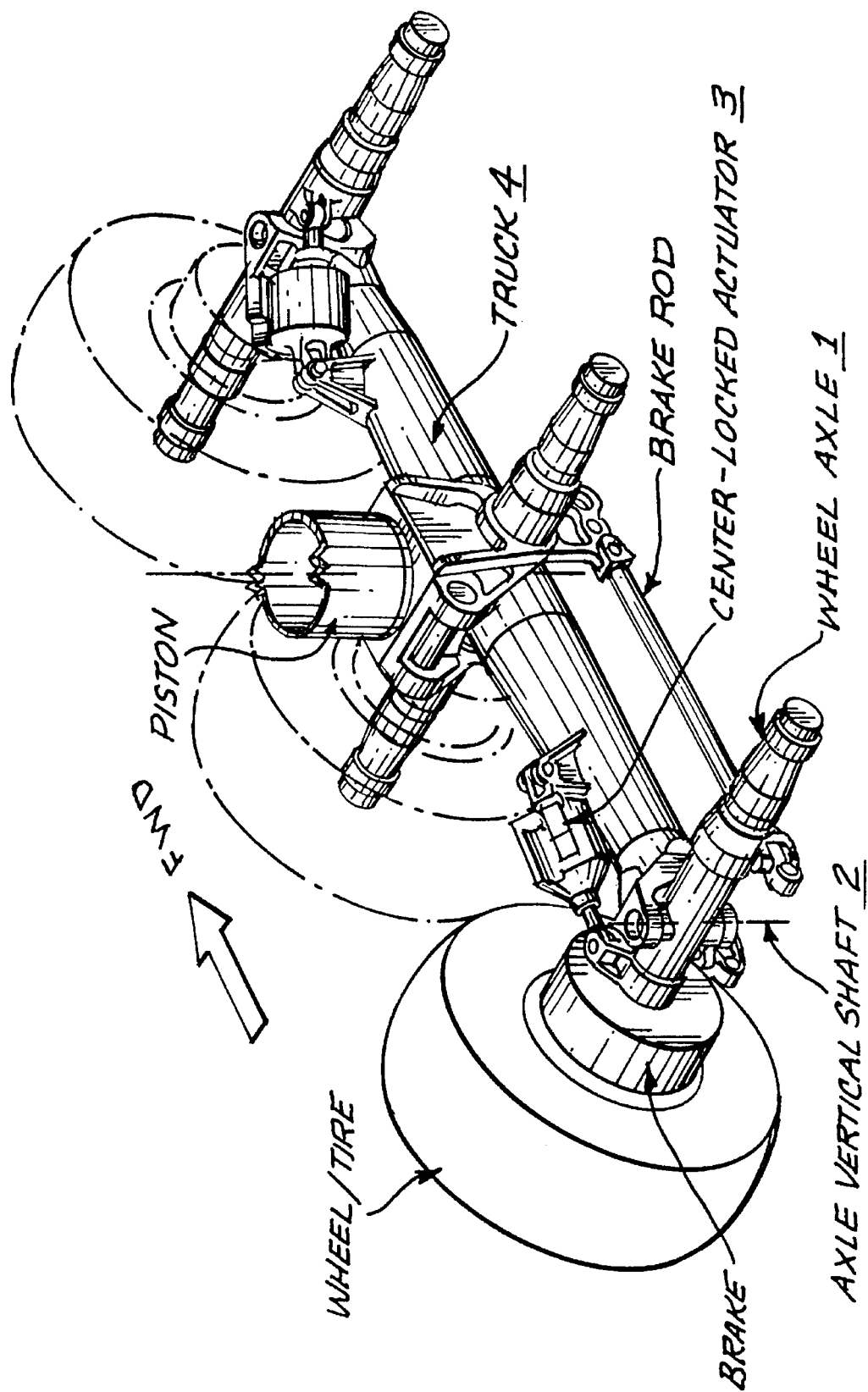
FIG. 1 is illustrative of an isometric view of the left hand gear of a six wheel truck assembly showing use of an actuator alone for providing power to drive the wheel axle about its vertical shaft; and, FIG. 2 is a section through the truck beam vertical plane illustrative of the manner of configuring the design of the truck beam to open up more space for the actuator.
Figure 2:
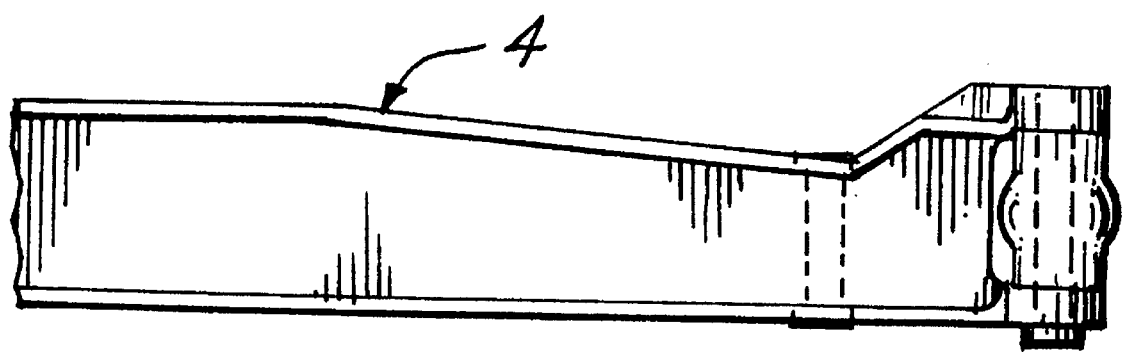

Turning now to the FIG. 1 of the drawings it will be seen that a set of wheels is driven about vertical shaft 2 using a single center locked actuator 3. The geometry layout including truck beam 4 configuration as shown in FIG. 2 frees up more space for center locked actuator 3 which alone provides the power to drive wheel axle 1 about its vertical shaft 2. In addition to steering, the functional requirements of this mechanism include the necessity of locking the wheel axle when steering is not being used. This function is integrated within center—locked actuator 3 as described in my earlier filed copending U.S. patent application titled "Landing Gear Axle Steering". The steering arrangement disclosed in my earlier filed copending U.S. patent application titled "Landing Gear Axle Steering" provides for a more compact arrangement using a center locking actuator and walking beam assistance. However, in those design conditions where more space is available in the region above the truck beam (due to a wider truck or e.g. repositioned torque links and accessories) then the present landing gear steering system without walking beam may be utilized to advantage. Of necessity, for a given axle turning moment required, the present single actuator without walking beam will have to exert a greater load and thus be larger in diametrical size than one with assistance.

One manner of increasing space available for the actuator is to reconfigure design of truck beam 4 as shown in FIG. 2 thereby reducing weight and cost through use of fewer components. Elimination of mechanical assistance by the present steering system configuration and advantages thereof is permitted instead of the steering configuration disclosed in my earlier filed copending U.S. patent application titled "Landing Gear Axle Steering" only through installation requirements where more space is available in the region above truck beam 4.

What is claimed is:

1. In combination in a six wheel three axle truck assembly having steerable forward and aft wheel axles, said forward and aft wheel axles having a vertical shaft, the improvement comprising in combination therewith:

a single center-locked steering actuator without assistance from a walking beam providing total power required to drive one of said forward or aft wheel axles about the vertical shaft of said forward or aft wheel axles.

2. The combination according to claim 1 wherein said six wheel three axle truck assembly includes a truck beam configured to provide space for said single center-locked steering actuator.

* * * * *